(12) United States Patent
Martin Sevilla et al.

(10) Patent No.: US 11,034,139 B2
(45) Date of Patent: Jun. 15, 2021

(54) SELF-SUPPORTING SYNTHETIC POLYMER WATERPROOFING MEMBRANE WITH SELF-REPAIR PROPERTIES

(71) Applicant: ATARFIL, S.L., Atarfe (ES)

(72) Inventors: Gabriel Martin Sevilla, Atarfe (ES); Emilio Carreras Torres, Atarfe (ES); Joaquin Hidalgo Betanzos, Azpeitia (ES); Maria Izascun Garmendia Barrena, Azpeitia (ES)

(73) Assignee: ATARFIL, S.L., Atarfe (ES)

( * ) Notice: Subject to any disclaimer, the term of this patent is extended or adjusted under 35 U.S.C. 154(b) by 77 days.

(21) Appl. No.: 15/736,628

(22) PCT Filed: Jun. 16, 2016

(86) PCT No.: PCT/ES2016/070456
§ 371 (c)(1),
(2) Date: Dec. 14, 2017

(87) PCT Pub. No.: WO2016/203086
PCT Pub. Date: Dec. 22, 2016

(65) Prior Publication Data
US 2018/0141316 A1    May 24, 2018

(30) Foreign Application Priority Data

Jun. 16, 2015    (EP) .................................... 15382320

(51) Int. Cl.
*B32B 27/08*    (2006.01)
*C08J 5/18*    (2006.01)
(Continued)

(52) U.S. Cl.
CPC .............. *B32B 27/08* (2013.01); *B32B 5/028* (2013.01); *B32B 27/306* (2013.01);
(Continued)

(58) Field of Classification Search
CPC ....... Y10T 428/24942; Y10T 428/2495; Y10T 428/24959; Y10T 428/24967;
(Continued)

(56) References Cited

U.S. PATENT DOCUMENTS

2009/0269565 A1 * 10/2009 Peng .................... B32B 27/32
428/220
2011/0042613 A1 * 2/2011 Loehner .................. C08L 33/24
252/194

(Continued)

FOREIGN PATENT DOCUMENTS

EP      2368707 A1 * 9/2011 ............. B32B 27/12
WO   2012/064698 A2    5/2012

OTHER PUBLICATIONS

Mark, James E.. (2009). Polymer Data Handbook (2nd Edition)—27. Ethylene-Vinyl Acetate Copolymer. Oxford University Press. Retrieved from app.knovel.com/hotlink/pdf/id:kt006PVL32/polymer-data-handbook/ethylene-vinyl-acetate (Year: 2009).*

(Continued)

*Primary Examiner* — Maria V Ewald
*Assistant Examiner* — Ethan A. Utt
(74) *Attorney, Agent, or Firm* — Sughrue Mion, PLLC

(57) ABSTRACT

The self-supporting synthetic polymer waterproofing membrane with self-repairing properties relates to a self-repairing synthetic waterproof membrane, applicable in the construction sector. This membrane can be monolayer or multilayer. The composition of these membranes comprises thermoplastic polymers, smectite-type clays and super water-absorbent polymers.

15 Claims, 5 Drawing Sheets

(51) Int. Cl.
  *B32B 27/32* (2006.01)
  *C08K 3/04* (2006.01)
  *B32B 27/30* (2006.01)
  *C08K 3/34* (2006.01)
  *B32B 5/02* (2006.01)
  *E04B 1/66* (2006.01)

(52) U.S. Cl.
  CPC ............ *B32B 27/308* (2013.01); *B32B 27/32* (2013.01); *C08J 5/18* (2013.01); *C08K 3/04* (2013.01); *C08K 3/346* (2013.01); *E04B 1/665* (2013.01); *B32B 2250/03* (2013.01); *B32B 2262/0253* (2013.01); *B32B 2262/0276* (2013.01); *B32B 2262/101* (2013.01); *B32B 2262/14* (2013.01); *B32B 2264/10* (2013.01); *B32B 2264/108* (2013.01); *B32B 2274/00* (2013.01); *B32B 2307/72* (2013.01); *B32B 2307/726* (2013.01); *B32B 2307/728* (2013.01); *B32B 2307/732* (2013.01); *B32B 2307/762* (2013.01); *B32B 2309/105* (2013.01); *B32B 2419/04* (2013.01); *B32B 2607/00* (2013.01); *C08J 2323/02* (2013.01); *C08K 2201/014* (2013.01)

(58) Field of Classification Search
  CPC ............ Y10T 428/24975; Y10T 428/26; Y10T 428/263; Y10T 428/264; Y10T 428/265; Y10T 428/266; Y10T 428/268; Y10T 428/269; Y10T 428/27; Y10T 428/273; Y10T 428/25; Y10T 428/251; Y10T 428/252; Y10T 428/256; Y10T 428/257; Y10T 428/258; Y10T 428/259; Y10T 428/31616; Y10T 428/31645; Y10T 428/31667; Y10T 428/31786; Y10T 428/31797; Y10T 428/31855; Y10T 428/31909; Y10T 428/31913; Y10T 428/31938; B32B 5/00; B32B 5/02; B32B 5/022; B32B 5/024; B32B 5/026; B32B 5/028; B32B 5/16; B32B 5/22; B32B 5/24; B32B 5/26; B32B 5/30; B32B 9/00; B32B 9/04; B32B 9/045; B32B 9/047; B32B 17/00; B32B 17/02; B32B 17/04; B32B 17/06; B32B 17/064; B32B 17/068; B32B 19/00; B32B 19/02; B32B 19/04; B32B 19/045; B32B 19/06; B32B 27/00; B32B 27/02; B32B 27/04; B32B 27/06; B32B 27/08; B32B 27/12; B32B 27/14; B32B 27/18; B32B 27/20; B32B 27/24; B32B 27/32; B32B 27/36; B32B 2264/10; B32B 2264/102; B32B 2305/30; B32B 2305/38; B32B 2307/70; B32B 2307/728; B32B 2307/73; B32B 2307/762; B32B 2315/16; B32B 2262/00; B32B 2262/02; B32B 2262/0253; B32B 2262/0276; B32B 2262/0284; B32B 2262/10; B32B 2262/101; B32B 2262/14; C08J 5/00; C08J 5/04; C08J 5/043; C08J 5/046; C08J 5/20; C08J 5/28; E04B 1/66; E04B 1/665; E04B 1/68; E04B 1/6803; E04B 1/6806; E04B 2001/6818; E04C 2/00; E04C 2/02; E04C 2/10; E04C 2/16; E04C 2/20; E04C 2/22; C08K 3/00; C08K 3/01; C08K 3/013; C08K 3/34; C08K 3/346; C08K 2201/014; C08K 2201/019; E40D 12/00; E40D 12/002; Y10S 428/912; E04D 12/00; E04D 12/002
  USPC ........ 428/212–216, 219, 220, 332, 334–341, 428/323–325, 328–331, 426, 428, 430, 428/432, 441, 446, 448, 451, 454, 480, 428/483, 500, 515, 516, 523, 912; 52/309.1, 309.13, 309.16, 408–413
  See application file for complete search history.

(56) References Cited

U.S. PATENT DOCUMENTS

2011/0177736 A1    7/2011   Donovan et al.
2015/0113894 A1*   4/2015   Kempenaers ......... E04B 1/6806
                                                                                    52/309.3

OTHER PUBLICATIONS

Written Opinion of the International Searching Authority of PCT/ES2016/070456 dated Sep. 15, 2016.

International Search Report of PCT/ES2016/070456 dated Sep. 15, 2016.

* cited by examiner

SELF-SUPPORTING SYNTHETIC POLYMER WATERPROOFING MEMBRANE WITH SELF-REPAIR PROPERTIES

CROSS REFERENCE TO RELATED APPLICATIONS

This application is a National Stage of International Application No. PCT/ES2016/070456, filed Jun. 16, 2016, claiming priority based on European Patent Application No. 15382320.8, filed Jun. 16, 2015, the contents of all of which are incorporated herein by reference in their entirety.

OBJECT OF THE INVENTION

The present invention, a self-supporting synthetic polymer waterproofing membrane with self-repair properties, relates to a synthetic membrane applicable in the construction sector. This self-supporting membrane can be monolayer or multilayer. The composition of the monolayer membrane comprises thermoplastic polymers, smectite-type clay materials and superabsorbent polymers (SAP) and is self-supporting, i.e. it is not accompanied by an ancillary layer, of the geotextile, reinforcement or geosynthetic drainage mesh type, acting as a support layer for the monolayer membrane. Likewise, the described monolayer membrane may be accompanied by other geosynthetic ancillary layers, giving rise to a multilayer membrane consisting of at least two layers, preferably three, the outer layers having a composition similar to those existing at present, geosynthetic, and the middle layer with a composition as specified above and object of the present invention.

The present invention, the self-supporting self-repairing synthetic membrane, is applicable to the field of building works, in the waterproofing of roofs and underground structures (floors, walls . . . ) and, in the field of civil works, in the sealing of landfills, canals, tunnels, water deposits, roads, walls, bridges. . .

DESCRIPTION OF THE STATE OF THE ART

Synthetic materials (polymers) are currently used for the manufacture of waterproofing membranes such as: polyethylene (PE), polypropylene (PP), polyvinyl chloride (PVC), ethylene propylene diene monomer (EPDM), bitumen . . . and/or combinations thereof which are mixed with small proportions of additives.

Combinations of different geosynthetic materials are also used, as in the case of "bentonite blankets" which are made from geocomposites, i.e. products formed from the combination of different geosynthetic materials, for example geotextile-bentonite-geotextile, geotextile-bentonite-plastic membrane, etc., all of which contain bentonite powder trapped between other layers of geosynthetics, thereby obtaining bentonite-based waterproofing systems for building and civil engineering works.

These synthetic or natural raw materials (PE, PP, PVC, EPDM, bitumen . . . ) are employed as raw materials for the manufacture of waterproofing membranes for installation at works which must have the following properties: high degree of water resistance, excellent mechanical properties and high durability, among others. Existing waterproofing membranes feature extremely low water absorption capacity and, owing to this feature, they are used for these applications. Furthermore, they do not present any absorption effect nor, therefore, swelling upon contact with water.

One of the major limitations of waterproofing membranes is their total inability to maintain their water-tightness once they are broken, since they are unable to stop the leakage of the fluid they contain once this break has occurred.

Different bentonite-based solutions are also used as waterproofing barriers both for civil engineering and building works applications, in addition to:

Bentonite grout or slurry to prevent subsidence in the construction of tunnels or for filling cracks.

Bentonite-based waterproofing blankets, comprising a geomembrane (waterproofing membrane, with the main function of supporting the affixed layer of bentonite)

Geocomposites comprising bentonite encapsulated between one or two layers of woven geotextile.

These products require the independent manufacture of the geosynthethics, which are subsequently mechanically joined, for example by welding, sewing or gluing such as, for example, to support the insulating component. Likewise, these manufacturing procedures limit the size of the membranes.

In the state of the art sodium bentonite, or montmorillonite, is known, which is a clay of the trilaminar phyllosilicate type (FIG. 1) of the smectite group whose structure is configured by the stacking of octahedral units mainly of aluminium in the form of a mesh, between two planes of Silicon (Si) tetrahedra, which include the simple or hydrated compensation cations.

The main structural feature of smectite-type clay is that both water and other polar molecules, including organic molecules, can penetrate the inter-laminar space, causing an expansion of the mesh. This phenomenon is due to the fact that the parallel sheets that make up this group of clays are joined by Van der Waals forces and other electrostatic forces. This structural design makes them ideal for acting as hydraulic barriers. In particular, the sodium bentonite family of clays are the most suitable for this application since they have the ability to expand their volume several times when they enter into contact with water, although calcium bentonites or mixtures of calcium and sodium are also used.

Bentonite is composed of a high percentage of Montmorillonite. Different types of bentonites are classified according to the cations present and their percentage. In industrial applications it has been shown that hectorite is in some cases superior to bentonite (primarily Montmorillonite) owing to its capacity for swelling and dispersibility. This has been attributed to its smaller particle size.

In addition to natural smectites, there are other synthetic options such as Laponite (synthetic hectorite), fluorohectorites or fluoride muscovites which can absorb water and swell in a manner similar to the smectites. There are clays with sodium activation (calcium bentonite, to obtain sodium bentonites).

The main limitation presented by waterproofing barriers that contain bentonite powder is that they conform waterproofing systems of different layers of geosynthetics in which it is necessary for the bentonite to be attached, supported and/or confined between the layers that make up the system, such as: geotextiles, geomembranes, geomeshes or combinations thereof, thereby guaranteeing the cohesion of the bentonite powder and preventing its migration and/or dispersal during and after installation.

Furthermore, superabsorbent polymers (SAP—Superabsorbent Polymer), are polymers that can absorb and retain extremely large amounts of a liquid relative to their own mass. Water-absorbent polymers, which are classified as hydrogels when they reticulate, absorb aqueous solutions through hydrogen bonds with the water molecules. The capacity of a SAP to absorb water is a factor of the ionic concentration of the aqueous solution.

SAPs with low density reticulation generally have a higher absorbent capacity and swell to a greater degree. These types of SAP also have a softer and stickier gel formation. Polymers with high density reticulation exhibit lower absorbent capacity and swell less, but the gel strength is firmer and the shape of the particles can be maintained, even under moderate pressure.

The main use for SAPs is found in disposable hygiene products, such as baby nappies, protective underwear for adults and sanitary pads. SAPs are also used to block water penetration into underground electric power or communications cables, horticultural water retention agents, spill and waste aqueous fluid control, and the production of artificial snow.

Acrylic polymers, or superabsorbent polymers (SAP) in their dry state, resemble a curled coil (FIG. 2). When these molecules are placed in water, hydrogen bridge links are established with the surrounding HOH causing them to become uncurled and straightened (FIG. 3).

When the molecules straighten, they increase the viscosity of the surrounding fluid. Superabsorbent chemistry requires two things: the addition of small molecules that transversely join the polymer strands forming a mesh (reticulation) and the partial neutralisation of the carboxyl acid groups (—COOH) along the main polymer chain (—COO$^-$Na$^+$).

The water molecules are attracted towards the mesh through a diffusion gradient which is formed by the neutralisation of sodium in the main polymer chain. The polymer chains attempt to straighten out, but are limited due to the reticulation. Thus, the particles expand as water passes to the mesh (FIG. 4).

The water molecules are firmly affixed to the carboxylate ions of the superabsorbent polymer mesh via hydrogen bridge links. Many soluble metals also have a tendency towards ionic exchange with the sodium along the main polymer chain and are retained, which is why polyacrylates can be used as sequestrants or chelating agents in some detergents for use in hard water. The appearance of a superabsorbent molecule appears in greater detail in FIG. 5, and, on a larger scale, the appearance of a superabsorbent polymer mesh can be seen in detail in FIG. 6.

Likewise, in the state of the art there may be membranes whose composition comprises thermoplastic polymers, smectite-type clays and superabsorbent polymers comprising a plasticiser. A plasticiser is a material that is incorporated to a plastic to facilitate its processing and improve its flexibility. The use of a plasticiser reduces the following in its composition:

viscosity in the molten state,
the elasticity module, and
the vitreous transition temperature (Tg) of a plastic.

Therefore, plasticisers are incorporated to a composition mainly to:

facilitate the transformation of the material,
increase impact resistance,
increase flexibility,
improve the ductility and tenacity of the polymers, and
reduce hardness and fragility.

However, in addition to the aforementioned advantages, the use of plasticisers entails certain problems, such as:

Toxicity problems: for example, high-toxicity polychlorinated biphenyls are no longer used as plasticisers.
Phtalic acid esters, such as DOP, may be extracted from blood stored in plasticised PVC bags and tubes. These aromatic esters may also become detached from PVC car seat covers by heat.

The loss of plasticiser in a plastic material converts it into a fragile material NOT suitable for the purpose for which it was manufactured, since it shortens its useful life enormously, and Some plasticisers used in the plastics industry are hazardous, such as for example "di-2-ethylhexyl phthalate" plasticisers, which are carcinogenic to animals in laboratory assays and this product is currently considered potentially carcinogenic.

Therefore, the object of the present invention is a self-supporting monolayer membrane whose composition comprises thermoplastic polymers, smectite-type clays and superabsorbent polymers without any type of plasticiser to avoid the disadvantages associated therewith.

DESCRIPTION OF THE INVENTION

The self-repairing property of the self-supporting waterproofing membranes object of this invention is due to the mixing of different percentages of thermoplastic polymers, smectite or bentonite type phyllosilicate clays and superabsorbent polymers (SAP).

The present invention considers smectite-type phyllosilicate clays to be the following: Montmorillonite (bentonite), beidellite, Nontronite, Laponite, fluorohectorites . . .

The thermoplastic polymers can be polyethylene, polypropylene, EVA copolymers . . . .

Likewise, the superabsorbent polymers may be hydrophilic resins (starch-based, polyacrylates, polyvinyl alcohol, PVA, PVOH) etc., and cross-linked sodium carboxymethyl cellulose, polyacrylic acid polymers, cross-linked polyvinyl alcohol, calcium alginate, starch-g-sodium acrylate copolymers.

Therefore, the object of this invention is to equip the self-supporting waterproofing membranes with self-sealing properties and therefore self-repairing capacity, for which purpose they must have great swelling and water absorption properties, an objective achieved by adding different amounts of bentonite clay to the polymer (between 1% and 95% by weight) and especially by the addition of an absorbent polymer, without it being necessary, as to date, to employ other layers to join, support or confine the bentonite powder and thus obtain a monolayer or multilayer product manufactured in a single and continuous process to achieve a membrane that is self-sealing when a breakage occurs therein (moisture barrier).

The property of being self-supporting, due to its composition, without using reinforcement materials in the layer that forms the membrane object of the invention, allows the monolayer membrane to support itself, i.e. it does not require reinforcement materials embedded in its composition, as occurs in the state of the art wherein the monolayer membranes, on not being self-supporting, use draining geotextiles or geocomposites (geodrains), which act as a support layer of the monolayer membrane. Evidently, the monolayer membrane object of the invention may be accompanied, in accordance with its application, by other ancillary geosynthetic layers, such as for example a waterproofing geomembrane, geotextiles or a draining geocomposite (geodrain), which act as a support layer of the monolayer membrane. Evidently, the monolayer membrane object of the invention may be accompanied, in accordance with its application, by other geosynthetic ancillary layers, such as for example a waterproofing membrane, geotextiles or a draining geocomposite (geodrains). As mentioned earlier, these ancillary layers are incorporated to the hermetic sealing solution of the monolayer membrane object of the present invention due to its specific functions, which are protection or filtration (geotextiles) or drainage (geodrains).

Any breakages that may occur in waterproof membranes cause them to lose their main characteristic of water-tightness. These breakages may occur during installation, via the action of the different machinery used (diggers, forklifts, trucks, etc.), owing to different irregularities in the terrain (sharp objects, stones, etc.) and so on, and even after installation, through the action of animals, plants, etc.

The object of the present invention is therefore, according to the above, a self-supporting waterproofing membrane with self-repairing properties in accordance with the first claim. Said membrane can have different constructions and may be formed by a single layer, i.e., a monolayer membrane; or by two or more layers, i.e., a multilayer membrane.

The self-supporting monolayer membrane consists of a single layer and its composition involves mixing different quantities of:

Polyolefin thermoplastic polymers, comprising: Polyethylenes, polypropylenes, EVA Copolymer or compounds with similar characteristics.

Superabsorbent polymer (SAP), chosen from the group comprising: Hydrophilic resins (starch-based, polyacrylates, polyvinyl alcohol, PVA, PVOH) etc., and cross-linked sodium carboxymethyl cellulose, polyacrylic acid polymers, cross-linked polyvinyl alcohol, calcium alginate, calcium alginate, starch-g-sodium acrylate copolymers or compounds with similar characteristics, and Inorganic fillers or combinations thereof such as smectite-type phyllosilicate clays, Montmorillonite (bentonite), Beidellite, Nontronite, Laponite, Fluorohectorites . . . , inorganic pigments (carbon black, titanium oxides, etc.).

The result of these mixtures is a self-repairing monolayer membrane that seals a breakage (hole, crack, . . . ) in the membrane, thereby preventing the fluid (water, . . . ) contained therein from escaping.

The multilayer membrane is also a self-repairing membrane, formed in this case by two or more layers, where one of the layers, typically an internal layer, is formulated like the self-supporting monolayer membrane described above and the other layers may be formed in the same way as current waterproofing membranes, so that, if there is a hole or crack-shaped breakage in the waterproofing membrane, this can be sealed thanks to the self-repairing properties of the inner layer owing to its special formulation, which as mentioned above, includes thermoplastic polymers (TPO), bentonite clays and superabsorbent polymers (SAP), upon contact with water.

In addition, the membranes object of this invention, whether self-supporting monolayer according to claim 1 or multilayer, which include a self-supporting monolayer membrane according to claim 1, can be joined together, for example, by means of welding, giving rise to joined membranes.

The components that make up the self-repairing monolayer membrane and self-repairing multilayer membrane comprise:

a) Plastic components made up of Thermoplastic Materials:
i) Such as polyolefin thermoplastics that include: Polyethylene, Polypropylene, Copolymer EVA . . .

ii) Superabsorbent polymers (SAP), hydrophilic resins (starch-based, polyacrylates, polyvinyl alcohol, PVA, PVOH), etc., and cross-linked sodium carboxymethyl cellulose, polyacrylic acid polymers, cross-linked polyvinyl alcohol, calcium alginate, starch-g-sodium acrylate copolymers.

b) Inorganic component/s formed by smectite-type phyllosilicate clays, which include: Montmorillonite (bentonite), Beidellite, Nontronite, Laponite and Fluorohectorites in a percentage by weight of the total formula of between 1% and 95%, or formed by mixtures of sodium bentonite with other inorganic fillers such as carbonates, bicarbonates, sulphates, etc., It is also possible to add different percentages of compatibilisation compounds to the above mixture to form bridges or links between the different components of the mixture (plastic and mineral fillers) in order to achieve good miscibility. These include stabilisers, fillers, vulcanising compounds, rubber accelerators, colouring agents, agents that prevent the formation of electrostatic charges, processing aids, antioxidants, UV light absorbers, flame-retardant compounds, foaming agents and other resinous ingredients.

The monolayer membrane, despite lacking a plasticiser in its composition, has features in terms of viscosity, elasticity module, vitreous transition temperature, impact resistance, flexibility, ductility and tenacity, hardness, fragility, . . . , in short, all those which are modified by plasticisers, which are even superior to plastics that use plasticisers in their formulation, without need to incorporate plasticisers in their formulation. The self-supporting monolayer membrane object of this invention is obtained by means of an extrusion process with subsequent calendering. Similarly, the manufacture of a monolayer membrane, for example formed by one or two outer layers, geomembranes, associated with the monolayer membrane object of claim 1 to form a geocomposite, is also manufactured using an extrusion procedure, without requiring post-processing or any subsequent manipulation.

Schematically, this extrusion-calendering equipment is composed of:

Extruder feeding equipment capable of applying loads to the plastic of between 1% and 95% by weight.

Extruder(s).

Co-extrusion equipment, capable of obtaining both monolayer and multilayer membranes that incorporate a monolayer membrane according to claim 1.

Minimum header width from 0.25 m.

Calender with one or more rollers.

Winding machines.

Conveyors.

The membranes described in this invention, either monolayer or multilayer (FIG. 7), obtained according to the co-extrusion procedure, can have a thickness of between 0.01 mm and 20 mm, however, the most common thicknesses for these membranes ranges between 1.00 mm and 5.00 mm.

Likewise, the self-supporting monolayer membrane object of the invention may reach a height of up to 12 metres due to its composition and to its manufacturing procedure.

DESCRIPTION OF THE FIGURES

To complement the description being made and to help better understand the features of the invention, a set of drawings is attached to the present specification as an integral part thereof, wherein in an illustrative and not limiting manner the following has been represented.

DESCRIPTION OF A PREFERRED MODE FOR CARRYING OUT THE INVENTION

A preferred mode for carrying out the object of this application will be described below, although the present invention is not limited to this particular example.

A formulation that includes the following components has been used for producing and obtaining self-supporting self-repairing membranes:

Thermoplastic polyolefin (TPO) resins with densities between 0.820 g/cc and 0.940 g/cc.
Sodium Bentonite.
Sodium Polyacrylate such as SAP.
Carbon Black Masterbatch and other additives, excluding plasticisers and lubricants.

This formulation has been processed in a co-rotating twin spool machine (extruder) attached to a flat header, and the formulations of membrane 1 and membrane 2 are shown in the following two tables (Table 1—Membrane 1 and Table 2—Membrane 2).

TABLE 1

Membrane 1.

| Component | Percentage Employed |
| --- | --- |
| TPO | 45 |
| Sodium Bentonite | 50 |
| Sodium Polyacrylate | 5 |

TABLE 2

Membrane 2.

| Component | Percentage Employed |
| --- | --- |
| TPO | 40 |
| Sodium Bentonite | 50 |
| Sodium Polyacrylate | 5 |
| Carbon Black and other additives | 5 |

The molten material flows out in the form of a membrane from the header of the extrusion machine. This hot, molten membrane is made to pass through the rollers of the calender where the membrane is subjected to a suitable cooling process. Once the resulting membrane is adequately cooled it is wound onto a spool.

The result was rolls of different lengths and widths of up to 12 metres.

The membranes obtained range in thickness from 1.00 mm to 5.00 mm.

Figure 1:
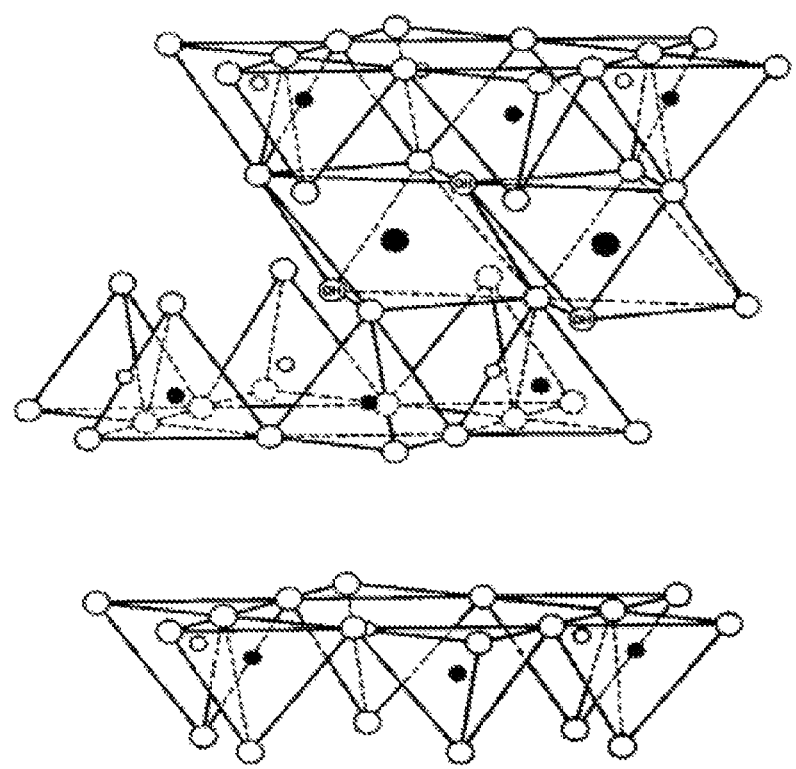
FIG. 1 shows a schematic representation of the structure of sodium bentonite, or Montmorillonite, which is configured by stacked octahedral units mainly of aluminium in the form of a mesh, sandwiched between two planes of silicon (Si) tetrahedra, which include the simple or hydrated compensation cations.
Figure 2:
FIG. 2 shows a schematic representation of a superabsorbent polymer in the dry state, with the curled coil shape.
Figure 3:
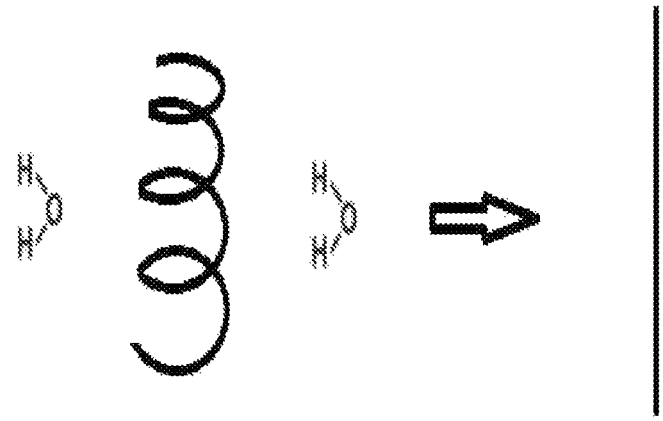
FIG. 3 shows the schematic procedure of mixing a molecule of a superabsorbent polymer in the dry state when it is placed in water (H2O).
Figure 4:
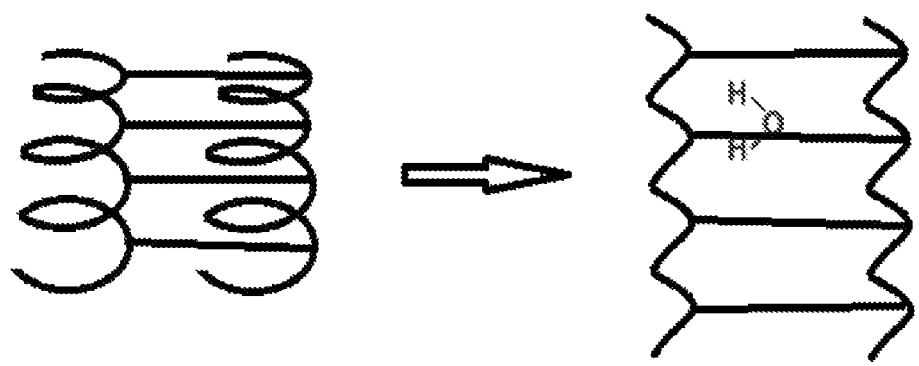
FIG. 4 shows the schematic procedure of mixing a mesh of superabsorbent polymer in water (H2O).
Figure 5:
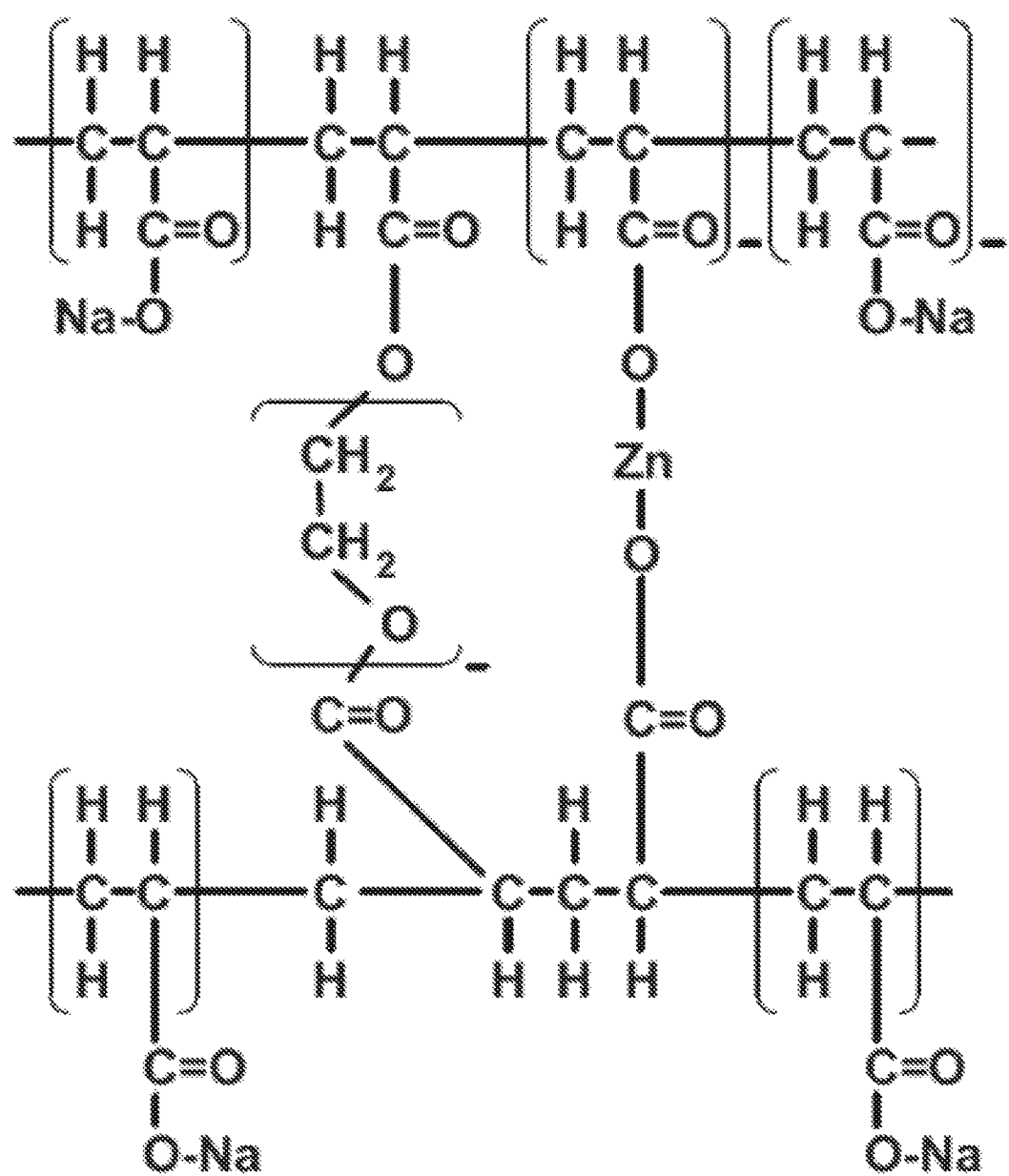
FIG. 5 shows a schematic representation of a superabsorbent molecule.
Figure 6:
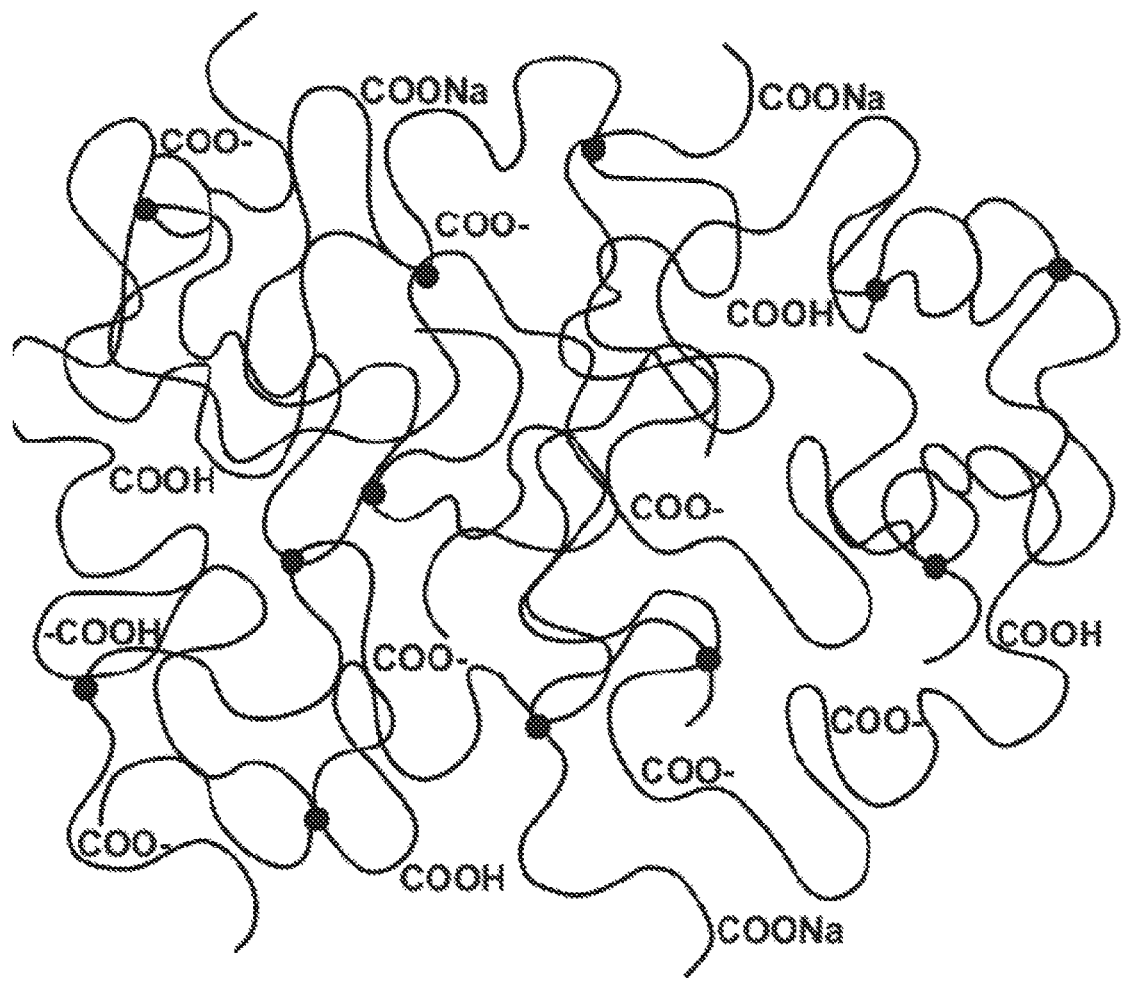
FIG. 6 shows a schematic representation of a superabsorbent polymer mesh.
Figure 7:
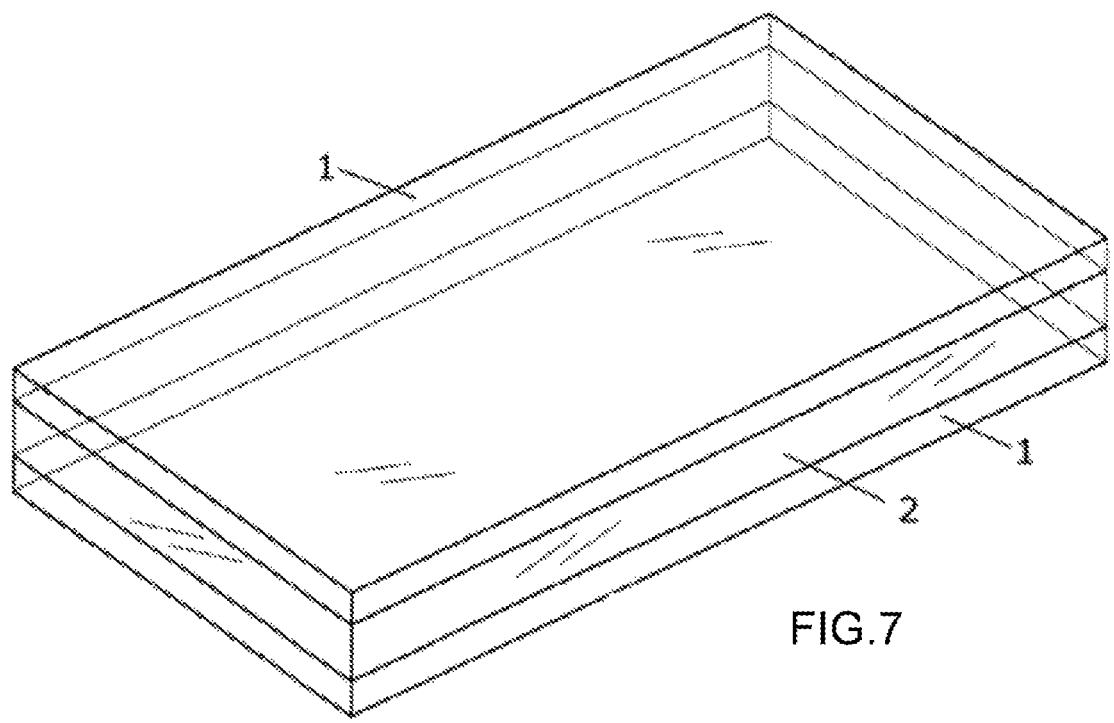
FIG. 7 shows a multilayer membrane object of the invention.

FIG. 7 shows an example of a multilayer membrane object of the invention, in which there is a self-supporting middle layer (2), according to claim 1, with at least one outer hydrophobic layer (1) on each side without clay or water-absorbing polymers, and representing a thickness ranging from 1% to 75% of the total thickness. The self-supporting middle layer preferably has a thickness representing between 25% and 99% of the total and, in addition, the outer layers (1) serve as reinforcement layers. Said reinforcement layer or layers may comprise at least one reinforcement mesh, which can be made of different materials such as polyester, fibreglass, polypropylene or combinations thereof.

The invention claimed is:

1. A synthetic polymer waterproofing membrane, comprising:
    an extruded monolayer that includes an inorganic filler, a thermoplastic polyolefin (TPO) plastic compound, and a super water absorbent polymer (SAP),
    wherein the inorganic filler includes a phyllosilicate clay of the smectite group;
    wherein the monolayer is configured to be self-supporting, which means that another layer is not necessary for joining, supporting or confining the monolayer;
    wherein the monolayer does not include a plasticizing material;
    wherein the monolayer is configured to be self-repairing;
    wherein the thermoplastic polyolefin (TPO) plastic compound comprises one or more selected from the group consisting of polyethylene, polypropylene, and EVA copolymer,
    wherein the thermoplastic polyolefin (TPO) plastic compound has a density ranging from 0.820 g/cc to 0.940 g/cc;
    wherein a content of the thermoplastic polyolefin (TPO) plastic compound is at least 40% by weight of a total weight of the monolayer; and
    wherein a content of the phyllosilicate clay is at least 15% by weight of a total weight of the monolayer.

2. The membrane, according to claim 1, further comprising an additional layer disposed on a surface of the monolayer.

3. The membrane, according to claim 1, wherein the inorganic filler is a mixture of bentonite and carbon black.

4. The membrane, according to claim 1, further comprising a hydrophobic layer disposed on a surface of the monolayer,
    wherein the hydrophobic layer does not include clay or water-absorbent polymers, and
    a thickness of the hydrophobic layer is from 1% to 75% of a total thickness formed by the monolayer and the hydrophobic layer.

5. The membrane, according to claim 4, wherein a thickness of the monolayer is between 25% and 99% of the total thickness formed by the monolayer and the hydrophobic layer.

6. The membrane, according to claim 1, further comprising a reinforcement layer disposed on a surface of the monolayer.

7. The membrane, according to claim 6, wherein the reinforcement layer comprises at least one reinforcing mesh.

8. The membrane, according to claim 7, wherein the reinforcing mesh is made of a material selected from polyester, fibreglass, polypropylene or combinations of thereof.

9. The membrane, according to claim 1, wherein the phyllosilicate clay of the smectite group is at least one selected from the group consisting of Montmorillonite, Beidellite, Nontronite, Laponite and fluorohectorites.

10. The membrane, according to claim 1, wherein the super water-absorbent polymer is at least one selected from the group consisting of hydrophilic resin, starch, polyacrylates, polyvinyl alcohol, PVA, PVOH, cross-linked sodium carboxymethyl cellulose, polyacrylic acid polymers, cross-linked polyvinyl alcohol, calcium alginate, and starch-g-sodium acrylate copolymer.

11. The membrane, according to claim 1, wherein the monolayer includes at least 45% by weight of thermoplastic polyolefin (TPO) plastic compound.

12. The membrane, according to claim 1, wherein the monolayer includes at least 50% by weight of the inorganic filler.

13. The membrane, according to claim 1, wherein the monolayer includes at least 50% by weight of the phyllosilicate clay of the smectite group.

14. The membrane, according to claim 1, wherein the phyllosilicate clay of the smectite group comprises bentonite.

15. A method for manufacturing the membrane according to claim 1, the method comprising:
    introducing in an extruder a composition including the inorganic filler, the (TPO) compound, and the super water absorbent polymer (SAP),
    melting the composition,
    extruding the melted composition in a shape of a membrane,
    cooling the membrane by calendering, and
    winding up the membrane.

* * * * *